United States Patent
Pedersen et al.

(10) Patent No.: US 7,514,892 B2
(45) Date of Patent: Apr. 7, 2009

(54) METHOD AND A CONTROL SYSTEM FOR STARTING A MOTOR FOR DRIVING A COMPRESSOR

(75) Inventors: Niels Pedersen, Soenderborg (DK); Rune Thomsen, Loegumkloster (DK)

(73) Assignee: Danfoss Compressors GmbH, Flensburg (DE)

( * ) Notice: Subject to any disclaimer, the term of this patent is extended or adjusted under 35 U.S.C. 154(b) by 371 days.

(21) Appl. No.: 11/528,011

(22) Filed: Sep. 27, 2006

(65) Prior Publication Data

US 2007/0070561 A1 Mar. 29, 2007

(30) Foreign Application Priority Data

Sep. 29, 2005 (DK) ................. 2005 01361

(51) Int. Cl.
*H02P 1/00* (2006.01)
*H02P 1/22* (2006.01)
(52) U.S. Cl. ................. 318/445; 318/254; 318/282; 318/448
(58) Field of Classification Search ................. 318/254, 318/282, 285, 445, 448
See application file for complete search history.

(56) References Cited

U.S. PATENT DOCUMENTS

| | | | | |
|---|---|---|---|---|
| 3,863,118 A * | 1/1975 | Lander et al. | ................ | 318/685 |
| 5,491,978 A | 2/1996 | Young et al. | .................. | 62/126 |
| 5,923,145 A * | 7/1999 | Reichard et al. | ............ | 318/811 |
| 5,970,733 A | 10/1999 | Hammaoka et al. | ............ | 62/228 |
| 6,147,465 A * | 11/2000 | Hollenbeck | ............ | 318/400.26 |
| 6,233,212 B1 * | 5/2001 | Kaaden | ...................... | 369/53.3 |
| 6,244,061 B1 * | 6/2001 | Takagi et al. | ................... | 62/229 |
| 6,825,625 B1 * | 11/2004 | Karwath et al. | ............. | 318/434 |
| 7,145,303 B2 * | 12/2006 | Lelkes | .................... | 318/400.09 |
| 7,307,393 B2 * | 12/2007 | Bizard | ........................ | 318/285 |
| 7,450,355 B2 * | 11/2008 | Ochiaki | ........................ | 361/31 |
| 2001/0028233 A1 * | 10/2001 | Omata et al. | ................ | 318/445 |
| 2002/0195979 A1 * | 12/2002 | Ishii | ........................... | 318/254 |
| 2003/0193307 A1 | 10/2003 | Burstein | ..................... | 318/473 |
| 2005/0035733 A1 | 2/2005 | Karwath et al. | ............. | 318/434 |
| 2006/0082338 A1 * | 4/2006 | Bizard | ........................ | 318/285 |
| 2008/0181785 A1 * | 7/2008 | Koehl | ........................... | 417/12 |

FOREIGN PATENT DOCUMENTS

DE   31 46 339 A1   6/1983

\* cited by examiner

*Primary Examiner*—Paul Ip
(74) *Attorney, Agent, or Firm*—McCormick, Paulding & Huber LLP

(57) ABSTRACT

A method and a control system for starting a motor (19), in particular a motor (19) for driving a compressor. The rotational speed (24) of the motor (19) is measured and compared to a minimum value. In the case that $\omega_{motor}$ (24) is smaller than the minimum value after a predefined time interval has lapsed, the motor (19) is stopped, and the maximum current level to be supplied by the power source (18) is changed, preferably increased, before a new attempt to start the motor (19) is initiated. Preferably, the voltage (22) supplied to an electronic unit (21) is also measured, and in the case that it drops below a minimum voltage level, the motor (19) is stopped, and the maximum current level is changed, preferably decreased, before a new start attempt is initiated. It is possible to adjust the supplied current level in such a way that power is conserved while sufficient lubricated of the moving parts of the compressor is ensured.

12 Claims, 3 Drawing Sheets

METHOD AND A CONTROL SYSTEM FOR STARTING A MOTOR FOR DRIVING A COMPRESSOR

CROSS REFERENCE TO RELATED APPLICATIONS

Applicant hereby claims foreign priority benefits under U.S.C. § 119 from Danish Patent Application No. PA 2005 01361 filed on Sep. 29, 2005 the contents of which are incorporated by reference herein.

FIELD OF THE INVENTION

The present invention relates to a method and a control system for starting a motor, e.g. a motor for driving a compressor. More particularly, the present invention relates to a method and a control system for starting such a motor in a manner which protects the compressor, in particular by ensuring sufficient lubrication to the moving parts of the compressor.

BACKGROUND OF THE INVENTION

When starting a motor it is sometimes desirable to reduce the current supplied to the motor in order to conserve power. This is, e.g., the case when the applied power source is a limited power source, such as a battery or a solar panel. However, there may also be other situations in which it is desirable to conserve power.

However, when the current supplied to the motor is reduced, the rotational speed of the motor decreases. In some motors, such as motors used for driving a compressor, lubrication of the moving parts is ensured by sucking oil and flinging it out by means of the compressor, thereby supplying oil to all the moving parts. In the case that the rotational speed of the motor is below a critical limit, the moving parts of the compressor will not be lubricated sufficiently in this manner, and the compressor will therefore eventually break down if the motor continues to run at the low rotational speed. In order to protect the compressor it is therefore important that the rotational speed of the motor is increased to a level above the critical limit relatively quickly during the start-up. This may be ensured simply by supplying current at a sufficiently high level. However, this would be in conflict with the desire to conserve power.

SUMMARY OF THE INVENTION

It is, thus, an object of the invention to provide a method of starting a motor in a manner which conserves power.

It is a further object of the invention to provide a method of starting a motor for driving a compressor in a manner which protects the compressor.

It is an even further object of the invention to provide a control system for starting a motor for driving a compressor, the control system being capable of conserving power while protecting the compressor.

According to a first aspect of the invention the above and other objects are fulfilled by providing a method of starting a motor, the method comprising the steps of:

1. connecting a power source to input terminals of an electronic unit controlling the motor, thereby supplying a current to the electronic unit from the power source, the electronic unit ensuring that the supplied current does not exceed a predefined maximum current level, $I_{max}$, 2. at least substantially continuously measuring a rotational speed, $\omega_{motor}$, of the motor, and comparing $\omega_{motor}$ to a predefined minimum rotational speed, $\omega_{min}$, 3. in the case that $\omega_{motor}$ is smaller than $\omega_{min}$ after a predefined time interval has lapsed, stopping the motor, 4. changing the predefined maximum current level, $I_{max}$, to be supplied from the power source to the electronic unit, and 5. repeating steps 1-4 until it is obtained that $\omega_{motor} \geq \omega_{min}$.

The electronic unit ensures that the supplied current does not exceed a predefined maximum current, $I_{max}$. $I_{max}$ is typically a limit which is set by the electronic unit as the maximum current which may be drawn from the power source during the present start-up attempt, or as the maximum current which may be supplied to the motor from the electronic unit. However, it should be noted that the power source will have an upper current limit defining the maximum possible current which can be drawn from the power source. Thus, step 4 should not be performed in such a way that $I_{max}$ is allowed to exceed this upper current limit. However, if $I_{max}$ is smaller than the upper current limit, step 4 may very well be performed by increasing $I_{max}$. This will be described further below.

The rotational speed, $\omega_{motor}$, of the motor is preferably measured using a microcontroller. Preferably, this is done by detecting zero crossings by the electromotive force generated by the motor when it moves. The length of a time interval which has elapsed between two such zero crossings is fed to the microcontroller and stored there. Knowing the number of zero crossings which corresponds to one revolution of the motor, it will be possible to calculate the rotational speed of the motor by adding the lengths of the corresponding number of time intervals, thereby obtaining an average time for one revolution of the motor.

The rotational speed, $\omega_{motor}$, of the motor is compared to a predefined minimum rotational speed, $\omega_{min}$. This is typically performed by means of a microcontroller.

In the case that $\omega_{motor}$ is smaller than $\omega_{min}$ after a predefined time interval has lapsed, the motor is stopped. The predefined time interval should be chosen in such a way that time is allowed for the motor to accelerate. On the other hand, the predefined time interval should not be so long that there is a risk that damage is caused to the motor, and/or to a compressor driven by the motor, due to a too small rotational speed as described above. The predefined time interval may be within a couple of seconds, such as within the time interval 0.5 seconds to 5 seconds, such as within the time interval 1 second to 3 seconds. Before a new attempt to start the motor is initiated, the predefined maximum current level, $I_{max}$, is changed in order to increase the probability of a proper start-up during the next attempt. Typically, $I_{max}$ will be increased in order to allow for a larger rotational speed of the motor. However, due consideration must be given to the upper current limit of the power source described above.

Thus, according to the invention, the motor may be started without drawing excessive current from the power source, yet in such a manner that the motor, and/or a compressor driven by the motor, is protected from damage due to insufficient lubrication of the moving parts. Thereby power may be conserved without risking damage to the motor and/or the compressor.

The start-up attempts are repeated until it is obtained that $\omega_{motor} \geq \omega_{min}$, i.e. until the motor is running in a correct manner without the risk of damage to the motor and/or to a compressor driven by the motor.

$\omega_{min}$ may be chosen as the minimum rotational speed required in order to ensure sufficient lubrication of the motor and/or to a compressor driven by the motor. For some applications, $\omega_{min}$ may advantageously be chosen to be approximately 1850 rpm.

The method may further comprise the steps of:
at least substantially continuously measuring an input voltage, $V_{input}$, at the electronic unit input terminals, and comparing $V_{input}$ to a predefined minimum voltage, $V_{min}$, and
in the case that $V_{input}$ becomes smaller than $V_{min}$, stopping the motor, and wherein step 5 further comprises repeating said steps and steps 1-4 until it is obtained that $V_{input} \geq V_{min}$.

According to this embodiment the motor is stopped in the case that $V_{input}$ becomes smaller than $V_{min}$. In the case that the power source is a battery, $V_{min}$ may advantageously be chosen as the minimum voltage required in order to protect the battery from collapsing. Thereby, in this embodiment of the invention $I_{max}$ can be selected with due consideration to conserving power, protecting the motor and/or a compressor driven by the motor, and protecting the power source.

Step 4 may advantageously comprise lowering $I_{max}$ in the case that $V_{input}$ becomes smaller than $V_{min}$, and increasing $I_{max}$ in the case that $\omega_{motor}$ is smaller than $\omega_{min}$ after the predefined time interval has lapsed. According to this particular embodiment of the invention, two different error conditions are applied, i.e. $\omega_{motor}$ is smaller than $\omega_{min}$ after the predefined time interval has lapsed, and $V_{input}$ becomes smaller than $V_{min}$. If one of these situations occurs, the motor is stopped. Once the motor has been stopped, the reason for stopping the motor must be established in order to redress the error. If the motor was stopped because $\omega_{motor}$ is smaller than $\omega_{min}$ after the predefined time interval has lapsed, then the supplied current is probably insufficient to accelerate the motor to an acceptable rotational speed. Accordingly, $I_{max}$ is increased before the next attempt to start the motor. If, on the other hand, the motor is stopped because $V_{input}$ becomes smaller than $V_{min}$ this indicates that a too large current is probably drawn from the power source. In the case that the power source is a battery, this situation may lead to collapse of the battery, and in order to avoid that, $I_{max}$ is lowered before the next attempt to start the motor.

Thus, in this manner the optimum level for $I_{max}$ is found with due consideration to all of the parameters described above.

The changing of the maximum permitted current level, $I_{max}$, to be supplied by the power source to the electronic unit may be performed by changing the level by a specific amount each time the motor has been stopped. Alternatively, the changing of $I_{max}$ may be performed by changing the level with a specific percentage of the previous level each time the motor has been stopped. In any case it should be ensured that $I_{max}$ is not changed in such a way that it exceeds the maximum possible current which can be drawn from the power source as described above.

It could be envisaged that a situation could occur where it is not possible to find a current level which ensures sufficient lubrication of the moving parts of the compressor while protecting the power source. In order to avoid and endless row of start-up attempts in this case, the method may comprise the step of stopping the process after a specific maximum number of unsuccessful attempts, e.g. 5-7 attempts. Subsequently, an error message, e.g. in the form of a light being turned on, a flashing light or a text message sent to a personal computer, may be generated in order to draw the attention of an operator to the problem. The operator may then investigate the reason for the problem and possibly solve it. The problem may, e.g., arise due to a weak battery, bad wiring, etc.

The method may further comprise the step of waiting for a specified time interval after the motor has been stopped and before repeating steps 1-4. This may allow electronic components in the electronic unit to cool down in case one or more components have become so hot that a proper start-up of the motor cannot be performed. Alternatively or additionally, in the case that the power source is a battery, the specified time interval may be selected in such a way that the output voltage of the battery is allowed to increase sufficiently to ensure that a new attempt to start the motor can be performed with a reasonable chance of success.

According to a second aspect of the invention the above and other objects are fulfilled by providing a control system for controlling starting of a motor, the control system comprising:
means for at least substantially continuously measuring a rotational speed, $\omega_{motor}$, of the motor,
means for comparing $\omega_{motor}$ to a predefined minimum rotational speed, $\omega_{min}$,
means for generating a stop signal to the motor in response to an output from the comparing means, and in the case that $\omega_{motor}$ is smaller than $\omega_{min}$ after a predefined time interval has lapsed, thereby stopping the motor, and
means for controlling the maximum permitted current level, $I_{max}$, to be supplied from a power source to an electronic unit controlling the motor in response to the stop signal.

It should be noted that a person skilled in the art would readily recognise that any feature described in connection with the first aspect of the invention can also be combined with the second aspect of the invention, and vice versa.

The means for measuring a rotational speed may be or comprise a microcontroller as described above. The comparing means also preferably is or comprises a microcontroller.

The control system may further comprise:
means for at least substantially continuously measuring an input voltage, $V_{input}$, on input terminals of the electronic unit,
means for comparing $V_{input}$ to a predefined minimum voltage, $V_{min}$, and
means for generating a stop signal to the motor in response to an output from the comparing means, and in the case that $V_{input}$ becomes smaller than $V_{min}$, thereby stopping the motor.

The means for measuring an input voltage may preferably be or comprise a resistive network divider and an A/D converter. The A/D converter may form part of a microcontroller. The means for comparing $V_{input}$ to $V_{min}$ preferably is or comprises a microcontroller, but it may alternatively or additionally be or comprise a relatively simple set-up of comparators and resistors.

The means for controlling the maximum current level, $I_{max}$, may be or form part of a microcontroller.

In one embodiment the power source may comprise a battery. In this case the method and control system according to the invention is capable of controlling the level of the supplied current in such a way that power is conserved to the maximum extent, the battery is protected and the motor and/or a compressor driven by the motor is protected. This is very advantageous.

The control system may advantageously form part of a starter assembly for a motor. The starter assembly may be adapted to be powered by a battery as described above. Furthermore, the motor may advantageously be adapted to drive a compressor, e.g. of the kind which forms part of a refrigeration system.

BRIEF DESCRIPTION OF THE DRAWINGS

The invention will now be further described with reference to the accompanying drawings in which.

DETAILED DESCRIPTION OF THE INVENTION

Figure 1:
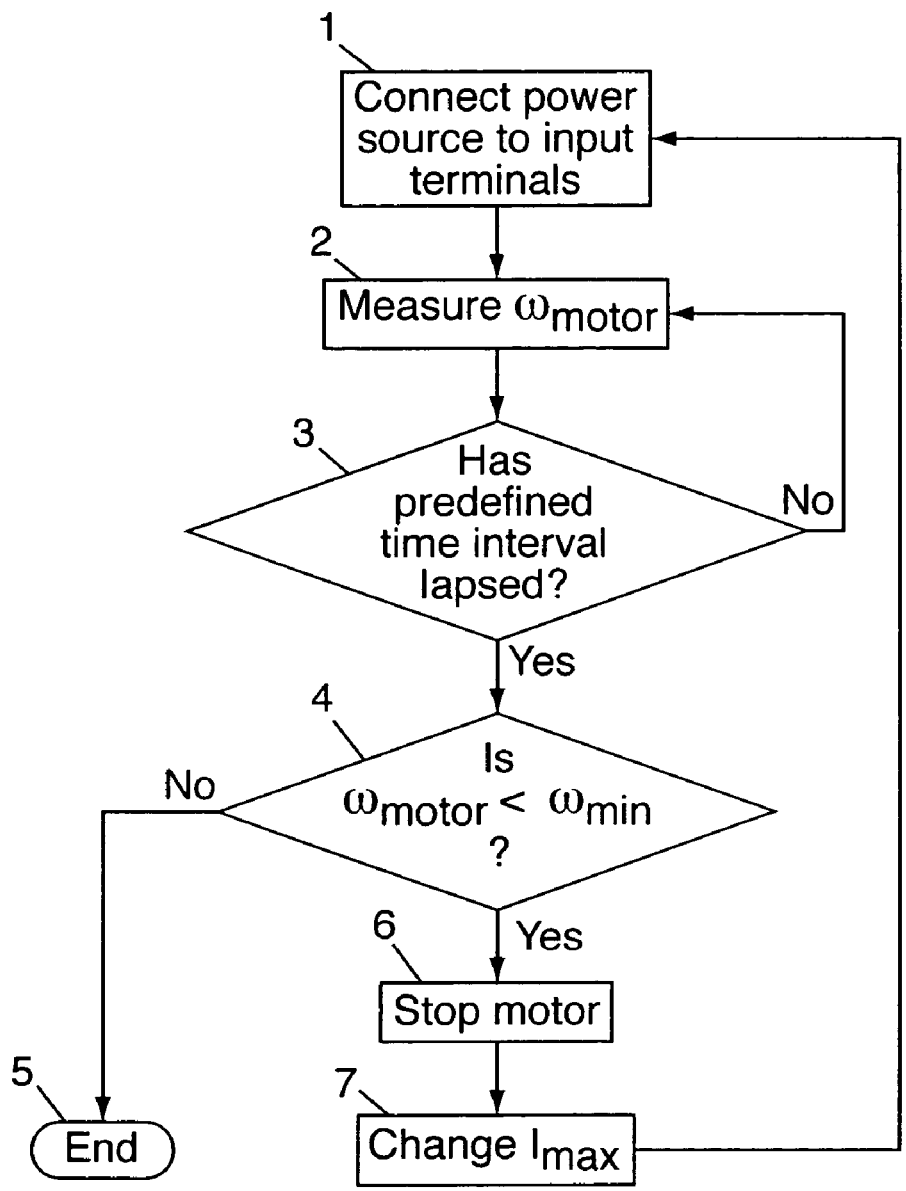
FIG. 1 is a flow chart illustrating a method of starting a motor according to an embodiment of the invention.

FIG. 1 is a flow chart illustrating a method of starting a motor according to an embodiment of the invention.

At step 1 a power source is connected to input terminals at an electronic unit controlling the motor. Thereby a current is supplied to the electronic unit from the power source. The electronic unit ensures that the supplied current does not exceed a predefined maximum current level, $I_{max}$.

At step 2 a rotational speed, $\omega_{motor}$, is measured, and at step 3 it is investigated whether or not a predefined time interval has lapsed since the power source was connected to the input terminals, and the attempt to start the motor was thereby initiated. The predefined time interval is selected to be sufficiently long to allow reasonable time for the motor to be accelerated, but sufficiently short to prevent that the motor keeps running at a rotational speed which is so low that sufficient lubrication of the moving parts can not be ensured.

If it is determined that the predefined time interval has not yet lapsed the process is returned to step 2. If it is determined that the predefined time interval has lapsed, it is investigated at step 4 whether or not $\omega_{motor}$ is smaller than a predefined minimum rotational speed, $\omega_{min}$. If this is not the case, then the motor is running as it should, and the attempt to start the motor has been successful. Accordingly, the process is ended at step 5. If, on the other hand, $\omega_{motor}$ is in fact smaller than $\omega_{min}$, the rotational speed of the motor is too low to ensure sufficient lubrication of the moving parts of a compressor driven by the motor, and the motor must therefore be stopped. This is done at step 6. Subsequently $I_{max}$ is changed at step 7, and the process is returned to step 1 in order to initiate another attempt to start the motor.

In most cases changing $I_{max}$ in the embodiment illustrated in the flow chart of FIG. 1 means increasing $I_{max}$ because the reason why $\omega_{motor}$ remains too small is probably that an insufficient current is supplied to the electronic unit or that a refrigeration system, in which the compressor is used, is heavily loaded.

Figure 2:
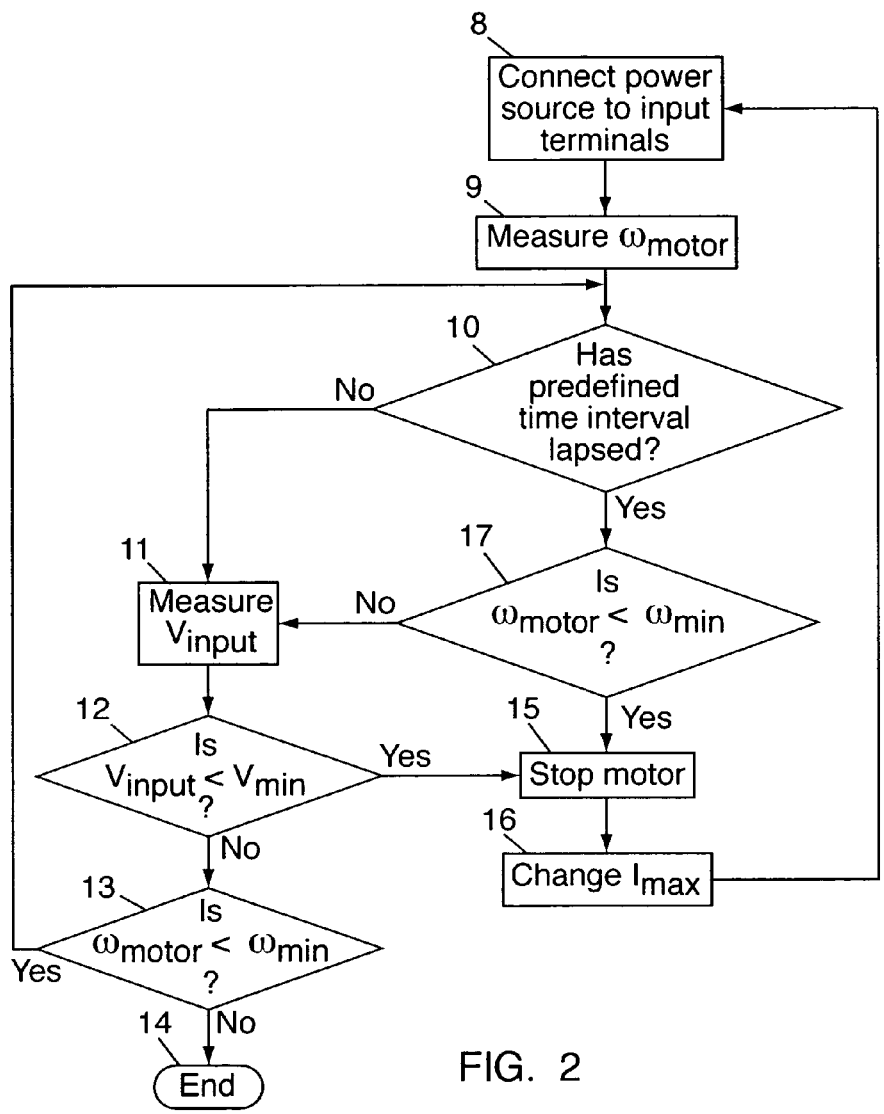
FIG. 2 is a flow chart illustrating a method of starting a motor according to another embodiment of the invention.

FIG. 2 is a flow chart illustrating a method of starting a motor according to another embodiment of the invention. The method illustrated in FIG. 2 is particularly useful in the case that the power source is a battery.

At step 8 a power source is connected to input terminals at an electronic unit controlling the motor. Thereby a current is supplied to the electronic unit from the power source. The electronic unit ensures that the supplied current does not exceed a predefined maximum current level, $I_{max}$.

At step 9 a rotational speed, $\omega_{motor}$, is measured, and at step 10 it is investigated whether or not a predefined time interval has lapsed since the power source was connected to the input terminals, and the attempt to start the motor was thereby initiated. This is very similar to the situation described with reference to FIG. 1.

If it is determined that the predefined time interval has not yet lapsed, an input voltage, $V_{input}$, on the electronic unit input terminals is measured at step 11, and at step 12 it is investigated whether or not $V_{input}$ is smaller than a predefined minimum voltage, $V_{min}$. If this is not the case, it is investigated at step 13 whether or not $\omega_{motor}$ is smaller than $\omega_{min}$. If this is not the case it is determined that the attempt to start the motor has been successful, and the process is accordingly ended at step 14. If, on the other hand, it is determined that $\omega_{motor}$ is in fact smaller than $\omega_{min}$ the process is returned to step 10 in order to investigate whether or not the predefined time interval has lapsed.

If it is determined at step 12 that $V_{input}$ is smaller than $V_{min}$ then a too large current is drawn from the power source, and the motor must therefore be stopped in order to protect the power source. This is done at step 15. Subsequently $I_{max}$ is changed at step 16, and the process is returned to step 8 in order to initiate another attempt to start the motor.

If it is determined at step 10 that the predefined time interval has lapsed it is investigated at step 17 whether or not $\omega_{motor}$ is smaller than $\omega_{min}$. If this is not the case, the process advances to step 11 where $V_{input}$ is measured as described above. If, on the other hand, $\omega_{motor}$ is in fact smaller than $\omega_{min}$, the rotational speed of the motor is too low to ensure sufficient lubrication of the moving parts of a compressor driven by the motor, and the motor must therefore be stopped. This is done at step 15, and $I_{max}$ is subsequently changed at step 16, and the process is returned to step 8 in order to initiate another attempt to start the motor.

The changing of $I_{max}$ at step 16 is preferably performed in such a way that in the case that the motor was stopped because $V_{input}$ was smaller than $V_{min}$, then $I_{max}$ is preferably lowered because this error is probably due to an excessive current being drawn from the power source (e.g. a battery). If, on the other hand, the motor was stopped because $\omega_{motor}$ was smaller than $\omega_{min}$ after the predefined time interval had lapsed, then $I_{max}$ is preferably increased because this error is probably due to the current being supplied being insufficient to allow a rotational speed which is high enough to ensure lubrication of the moving parts of a compressor driven by the motor.

Thus, according to the method illustrated in the flow chart of FIG. 2 $I_{max}$ can be chosen in such a way that a sufficient current level is supplied to ensure proper lubrication of the moving parts of the compressor driven by the motor, but not more than that. Thus, due consideration can be taken to protection of the compressor, power conservation and protection of a potential weak power source, e.g. a weak battery.

Figure 3:
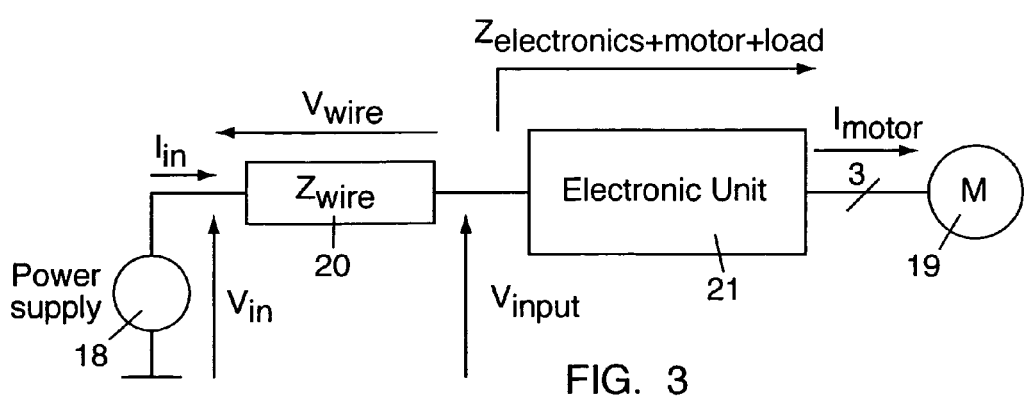
FIG. 3 is a diagrammatic view of a starter assembly according to an embodiment of the invention.

FIG. 3 is a diagrammatic view of a starter assembly according to an embodiment of the invention. The starter assembly comprises a power supply 18 connected to a motor 19 via wires 20 and an electronic unit 21. The motor 19 is preferably connected to a compressor (not shown).

During alignment (positioning) and acceleration of the motor 19 a relatively large current, $I_{in}$, is drawn from the power supply 18. The input current may give rise to a relatively large voltage drop, $V_{wire}$, in the wires 20 in the case that wrongly dimensioned wires are used, due to the impedance, $Z_{wire}$, introduced by the wires 20. The large current can have the effect that the voltage, $V_{input}$, across the electronic unit 21 drops below a minimum voltage level which is selected in order to protect the power supply 18. Therefore, when this happens the motor 19 must be stopped.

Furthermore, during alignment (positioning) of the motor 19 the current, $I_{motor}$, supplied to the motor 19 is fixed by a controller and the electronic unit 21. A fixed value for $I_{motor}$ gives rise to a fixed input current, $I_{in}$, drawn from the power supply 18. During alignment the rotational speed of the motor 19 should be above a certain level, and this should be achieved within a certain time interval. It is very essential that the speed limit is reached within the time interval, and preferably as fast as possible, due to the fact that lubrication of moving parts of a compressor driven by the motor is ineffective when the motor 19 is running at a lower rotational speed. A large starting torque can only be achieved with a relatively high motor current, $I_{motor}$, according to the following motion equation:

$$T_{motor} = k_\tau \cdot I_{motor} = T_{load} + J \cdot \frac{d\omega_{motor}}{dt} \Rightarrow \frac{d\omega_{motor}}{dt} = \frac{k_\tau \cdot I_{motor} - T_{load}}{J},$$

wherein
$T_{motor}$ is the produced motor torque,
$K_\tau$ is the motor torque constant,
$I_{motor}$ is the motor current,
$T_{load}$ is the compressor load torque,
J is the system inertia, and
$\omega_{motor}$ is the rotational speed of the motor.

In essence this means that two aspects may potentially stop the motor from starting successfully.

Large voltage drops in the wires 20 due to a large motor current, $I_{motor}$, being drawn, the voltage to the electronic unit 21, $V_{input}$, thereby dropping below the minimum voltage level, thereby introducing a risk of damaging the power source 18. This is particularly relevant if the power source 18 is a battery.

Low motor current level, $I_{motor}$, giving a small motor torque, thereby resulting in a poor acceleration of the motor 19. Thereby it is not possible to reach the minimum rotational speed level within the specified time interval, and there is therefore a risk that the moving parts of a compressor driven by the motor 19 are not lubricated sufficiently, and that the compressor may therefore suffer damage.

Figure 4:
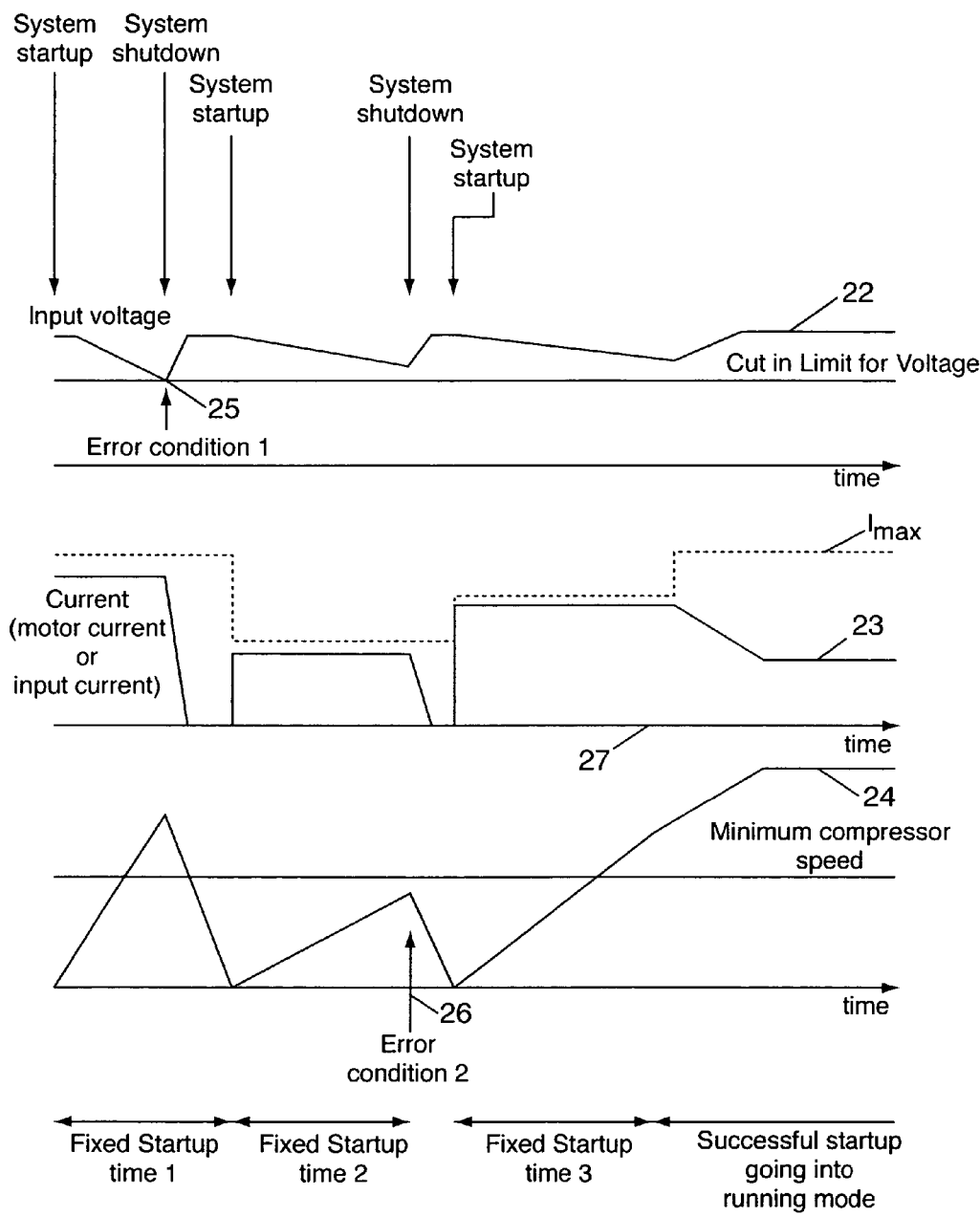
FIG. 4 shows input voltage, motor current and motor speed as a function of time during a start-up sequence for a motor.

FIG. 4 shows input voltage 22, current 23 and motor speed 24 as a function of time during a start-up sequence for a motor. The current 23 may either be an input current supplied from the power source to the electronic unit or it may be a motor current supplied from the electronic unit to the motor.

Initially, a power supply is connected to a motor. The maximum current level, $I_{max}$, which can be supplied from the power supply or supplied to the motor is set relatively high. It is thereby attempted to start the motor. During the attempt the input voltage 22 as well as the motor speed 24 are monitored. During the first attempt to start the motor shown in FIG. 4 the large current causes the input voltage 22 to be dragged down. At time 25 the input voltage 22 reaches the minimum voltage level, and the motor must therefore be stopped in order to protect the power supply. As a consequence the current 23 as well as the motor speed 24 decreases during the time interval following time 25.

Before the next attempt to start the motor is initiated, $I_{max}$ is lowered. Thereby the current 23 is kept at a lower level during the next attempt. As a consequence the input voltage 22 stays above the minimum voltage level. However, the relatively low current level 23 has the consequence that the motor speed 24 can not reach the minimum rotational speed level within the specified time interval. Thus, at time 26, when the specified time interval has lapsed the motor speed 24 is still too low, and the motor must therefore once again be stopped. As a consequence the current 23 as well as the motor speed 24 decreases during the time interval following time 26.

Before the next attempt to start the motor is initiated, $I_{max}$ is increased to a level in between the level of the first start attempt and the level of the second start attempt, because the two previous attempts revealed that the level of the first start attempt was too high and the level of the second start attempt was too low.

As it is clear from the Figure, the maximum current level selected for the third attempt is appropriate since it is obtained that the motor speed 24 reaches the minimum speed level within the specified time interval, and the input voltage 22 remains above the minimum voltage level. Therefore the motor is started correctly in the third attempt. Once the motor has been accelerated to a desired speed level, there is no longer a need for limiting the current, and $I_{max}$ is therefore set to the maximum value at time 27.

It should be noted that in the case that the third attempt results in either the input voltage 22 dropping below the minimum voltage level or the motor speed 24 being below the minimum speed level after the predefined time interval has elapsed, the motor will of course once again be stopped and $I_{max}$ changed accordingly before a fourth attempt to start the motor is initiated.

The embodiment of FIG. 4 very well illustrates that the two conditions for stopping the start-up sequence are each others opposite parts. A high current level 23 will provide a large motor torque and faster acceleration of the motor, but it will also produce a drop in the input voltage 22 which can bring the voltage level supplied to the electronics of the motor to an unacceptable level. The method illustrated in FIG. 4 takes both of these aspects into account during the start-up sequence, and an optimum current level is therefore found. Each time the motor must be stopped due to one of the conditions described above, $I_{max}$ is lowered or increased in accordance with the reason for stopping the motor.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A method of starting a motor (19), the method comprising the steps of:
    1. connecting a power source (18) to input terminals of an electronic unit (21) controlling the motor (19), thereby supplying a current (23) to the electronic unit (21) from the power source (18), the electronic unit (21) ensuring that the supplied current (23) does not exceed a predefined maximum current level, $I_{max}$,
    2. at least substantially continuously measuring a rotational speed, ($\omega_{motor}$, of the motor (19), and comparing $\omega_{motor}$ to a predefined minimum rotational speed, $\omega_{min}$,
    3. in the case that $\omega_{motor}$ is smaller than $\omega_{min}$ after a predefined time interval has lapsed, stopping the motor (19),
    4. changing the predefined maximum current level, $I_{max}$, to be supplied from the power source (18) to the electronic unit (21), and
    5. repeating steps 1-4 until it is obtained that $\omega_{motor} \geq \omega_{min}$.

2. A method according to claim 1, wherein $\omega_{min}$ is chosen as the minimum rotational speed required in order to ensure sufficient lubrication of the motor (19) or of a compressor driven by the motor (19).

3. A method according to claim 1 or 2, further comprising the steps of:

at least substantially continuously measuring an input voltage, $V_{input}$, at the electronic unit (21) input terminals, and comparing $V_{input}$ to a predefined minimum voltage, $V_{min}$, and in the case that $V_{input}$ becomes smaller than $V_{min}$, stopping the motor (19), and wherein step 5 further comprises repeating said steps and steps 1-4 until it is obtained that $V_{input} \geq V_{min}$.

4. A method according to claim 3, wherein step 4 comprises lowering $I_{max}$ in the case that $V_{input}$ becomes smaller than $V_{min}$, and increasing $I_{max}$ in the case that $\omega_{motor}$ is smaller than $\omega_{min}$ after the predefined time interval has lapsed.

5. A method according to any of the preceding claims, further comprising the step of waiting for a specified time interval after the motor (19) has been stopped and before repeating steps 1-4.

6. A control system for controlling starting of a motor (19), the control system comprising:

means for at least substantially continuously measuring a rotational speed, ($\omega_{motor}$, of the motor (19), means for comparing $\omega_{motor}$ to a predefined minimum rotational speed, $\omega_{min}$, means for generating a stop signal to the motor (19) in response to an output from the comparing means, and in the case that $\omega_{motor}$ is smaller than $\omega_{min}$ after a predefined time interval has lapsed, thereby stopping the motor (19), and means for controlling the maximum permitted current level, $I_{max}$, to be supplied from a power source (18) to an electronic unit (21) controlling the motor (19) in response to the stop signal.

7. A control system according to claim 6, further comprising:

means for at least substantially continuously measuring an input voltage, $V_{input}$, at input terminals of the electronic unit (21), means for comparing $V_{input}$ to a predefined minimum voltage, $V_{min}$, and means for generating a stop signal to the motor (19) in response to an output from the comparing means, and in the case that $V_{input}$ becomes smaller than $V_{min}$, thereby stopping the motor (19).

8. A control system according to claim 6 or 7, wherein the means for controlling the maximum current level, $I_{max}$, is or forms part of a microcontroller.

9. A control system according to any of claims 6-8, wherein the power source (18) comprises a battery.

10. A starter assembly for a motor (19), the starter assembly comprising a control system according to any of claims 6-9.

11. A starter assembly according to claim 10, the starter assembly being adapted to be powered by a battery.

12. A starter assembly according to claim 10 or 11, wherein the motor (19) is adapted to drive a compressor.

* * * * *